(12) United States Patent
Buch

(10) Patent No.: US 6,249,842 B1
(45) Date of Patent: Jun. 19, 2001

(54) APPARATUS AND METHOD FOR PROCESSING DATA IN A RAID SYSTEM

(75) Inventor: Bruce Buch, Westboro, MA (US)

(73) Assignee: Quantum Corporation, Milpitas, CA (US)

(*) Notice: Subject to any disclaimer, the term of this patent is extended or adjusted under 35 U.S.C. 154(b) by 0 days.

(21) Appl. No.: 09/215,505

(22) Filed: Dec. 17, 1998

(51) Int. Cl.⁷ .............. G06F 12/00; G06F 13/00
(52) U.S. Cl. .............. 711/114; 711/112; 710/52
(58) Field of Search .............. 711/112–114; 710/52

(56) References Cited

U.S. PATENT DOCUMENTS 5,838,892 * 11/1998 Wilson .................. 395/182.04
5,956,351 * 9/1999 Bossen et al. .......... 371/37.6

* cited by examiner

Primary Examiner—Matthew Kim
Assistant Examiner—Pierre M. Vital
(74) Attorney, Agent, or Firm—Fish & Richardson

(57) ABSTRACT

An apparatus includes a host port for coupling to a host. A storage disk is coupled to a disk port. A memory is provided for storing opcodes, data buffer pointers associated with the opcodes, and data in data buffers indicated by the data buffer pointers. A data transfer circuit is provided to store an address corresponding to a selected one of the opcodes. The data transfer circuit is responsive to a mode indicated by the selected opcode to transfer data between a selected data buffer associated with the selected opcode and one of the ports.

30 Claims, 5 Drawing Sheets

APPARATUS AND METHOD FOR PROCESSING DATA IN A RAID SYSTEM

BACKGROUND

This invention relates to data storage and retrieval in a Redundant Array of Independent Drives (RAID) System.

RAID Systems distribute data across several disk drives, magnetically storing the data as binary bits on several disks for each disk drive. The data are stored in blocks on each drive, with the blocks of each drive having counterpart blocks on other drives. These counterpart blocks on each drive form a stripe of data blocks. The disk drives store the data in these counterpart blocks such that the data from any one drive can be recreated from data in the counterpart blocks of the other drives of that stripe.

As technology advances, consumers demand faster processing speeds of computer systems, including RAID systems. At the same time, the complexity of computer systems including software run by the computer systems, is increasing. Therefore it is desirable to reduce the processing times needed to manipulate data, including storing and retrieving data, in order to accommodate computer users' demands of faster processing times.

SUMMARY

According to one aspect of the invention, an apparatus includes a host port for coupling to a host. A storage disk is coupled to a disk port. A memory is provided for storing opcodes, data buffer pointers associated with the opcodes, and data in data buffers indicated by the data buffer pointers. A data transfer circuit is provided to store an address corresponding to a selected one of the opcodes. The data transfer circuit is responsive to a mode indicated by the selected opcode to transfer data between a selected data buffer associated with the selected opcode and one of the ports.

According to another aspect of the invention, an apparatus includes a host port for coupling to a host. A storage disk is coupled to a disk port. A memory is provided for storing opcodes, data buffer pointers associated with the opcodes, and data in data buffers indicated by the data buffer pointers. An exclusive-OR processor circuit is provided to store addresses corresponding to a first selected opcode and a second selected opcode. The data transfer circuit is responsive to modes indicated by the first and second selected opcodes to exclusive-OR the data stored in the data buffers associated with the first and second selected opcodes.

According to another aspect of the invention, a method of electronically manipulating data in a storage drive, the storage drive including a host port for coupling to a host and a data port coupled to a plurality of storage disks, includes setting an opcode to indicate a mode, the opcode being associated with a data buffer. The method also includes transferring data between one of the ports and the data buffer, using a data transfer circuit, in response to the mode indicated by the opcode.

According to another aspect of the invention, a method of electronically manipulating data in a storage drive, the storage drive including a host port for coupling to a host and a data port coupled to a plurality of storage disks, includes setting a plurality of opcodes, each indicating a mode, the opcodes being associated with data buffers. The method also includes exclusive-ORing data in the data buffers corresponding to the opcodes, using an exclusive-OR processor circuit, in response to modes indicated by the opcodes.

According to another aspect of the invention, a storage device adapter includes a host data port for coupling to a host. A disk data port is provided for coupling to a storage disk. An interface is provided for coupling to memory. An exclusive-OR processor circuit is responsive to modes indicated by opcodes received through the interface to exclusive-OR data, corresponding to the opcodes, received through the interface.

Various aspects of the invention may provide one or more of the following advantages can be performed without firmware intervention. The time required for processing data for exclusive-OR data write and exclusive-OR parity write operations is reduced compared to prior art arrangements. Hardware circuits can perform portions of exclusive-OR data write and exclusive-OR parity write operations independent of a main processor and firmware, and of each other. The hardware circuits can perform portions of the operations in parallel.

DESCRIPTION OF THE DRAWINGS

The foregoing features and other aspects of the invention will be more fully understand form the description below in conjunction with the accompanying drawings, in which.

DESCRIPTION OF PREFERRED EMBODIMENTS

Figure 1:
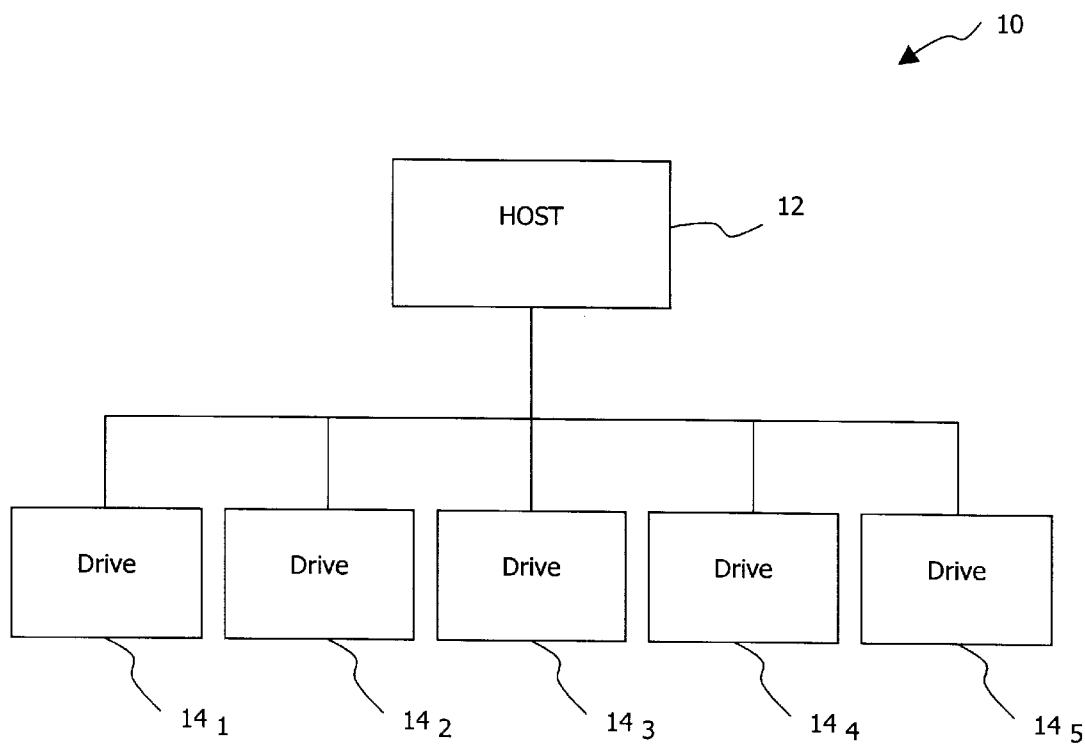
FIG. 1 is a block diagram of a RAID System including a host and several disk drives.

FIG. 1 shows a RAID system 10, including a host 12 and several disk drives 14, for storing and retrieving data electronically. The host 12 is a computer, such as a personal computer, and communicates with the disk drives 14 to store data in, and retrieve data from, the disk drives 14. The host 12 communicates with the disk drives 14 through a bus 13 that implements the Small Computer System Interconnect (SCSI) protocol. Other protocols, however, can be used. The host 12 and/or the disk drives 14 can reproduce the data stored on any one of the disk drives 14 from the data stored on the other disk drives 14.

In order to reproduce data stored on a disk drive 14, one of the disk drives 14 is used to store parity information based on the data stored in the other disk drives 14. Although the disk drive 14 storing the parity block data can vary from one stripe to the next, here disk drive $14_5$ stores the parity data for all of the stripes. Thus, using D[m,n] to denote the nth data block on the mth data drive 14, D[P,n] to denote the nth data block on the disk drive 14 containing the parity block data for the nth stripe, and "$\oplus$" to denote logical exclusive-ORing, and using disk drive $14_5$ as the parity drive, then:

$$D[5, n]=D[P, n]=D[1, n]\oplus D[2, n]\oplus D[3, n]\oplus D[4, n] \quad (1)$$

Due to the properties of exclusive-ORing, the data from any one data block in a stripe can be reproduced by exclusive-ORing the data from the other four data blocks in that stripe. For example, if disk drive $14_3$ failed, then D[3, n] can be reproduced according to:

$$D[3, n]=D[1, n] \oplus D[2, n] \oplus D[4, n] \oplus D[P, n] \quad (2)$$

Whenever the data stored in a data block is changed, the data stored in the corresponding parity data block is updated. For example, if D[3, n] changes, then the corresponding parity data block before modification is:

$$D[P, n]_{(old)}=D[1, n] \oplus D[2, n] \oplus D[3, n]_{(old)} \oplus D[4, n] \quad (3)$$

and after modification is:

$$D[P, n]_{(new)}=D[1, n] \oplus D[2, n] \oplus D[3, n]_{(new)} \oplus D[4, n] \quad (4)$$

Using equation (4) to update the parity block requires access to all of the disk drives 14.

The system 10, however, can modify the parity block data by accessing only the disk drive 14 containing the data block to be modified, and the parity disk drive, here $14_5$. Modifying the parity disk drive $14_5$ is possible by accessing only these two disk drives 14 because, from equation (3):

$$D[1, n] \oplus D[2, n] \oplus D[4, n]=D[P, n]_{(old)} \oplus D[3, n]_{(old)} \quad (5)$$

and because substituting the left-hand side of equation (5) into equation (4) yields:

$$D[P, n]_{(new)}=D[P, n]_{(old)} \oplus D[3, n]_{(old)} \oplus D[3, n]_{(new)} \quad (6)$$

Using equation (6) only requires access to the parity disk drive $14_5$ and the disk drive 14 to be modified, here disk drive $14_3$. In essence, applying equation (6) modifies the parity data by removing the contribution of the existing data $D[3, n]_{(old)}$, and adding the contribution of the new data $D[3, n]_{(new)}$.

Modifying the parity data according to equation (6) is performed in two stages, with each stage being performed in a separate disk drive 14. Equation (6) can be rewritten as two equations:

$$X[3, n]=D[3, n]_{old} \oplus D[3, n]_{new} \quad (7)$$

$$D[P, n]_{new}=D[P, n]_{old} \oplus X[3, n] \quad (8)$$

where X[m,n] represents an intermediate, temporary block of data. Equations (7) and (8) involve only disk drives $14_3$ and $14_5$ respectively and can therefore be performed locally at the respective disk drives $14_3$ and $14_5$. The process of performing equation (7) (or similar equations for other drives) and writing the new block data, here $D[3, n]_{new}$, to the appropriate disk drive 14 is called an exclusive-OR data write (XDWRITE). The host 12 retrieves the intermediate data X[m,n] by issuing an XDREAD command to perform an XDREAD, and transfers the intermediate data X[m,n] to the disk drive 14 containing the parity data for the nth stripe. The process of performing equation (8) (or similar equation for other intermediate data X[m,n]) and writing the new parity block data $D[P, n]_{new}$ to the parity disk drive, here $14_5$, is called an exclusive-OR parity write (XPWRITE).

Figure 2:
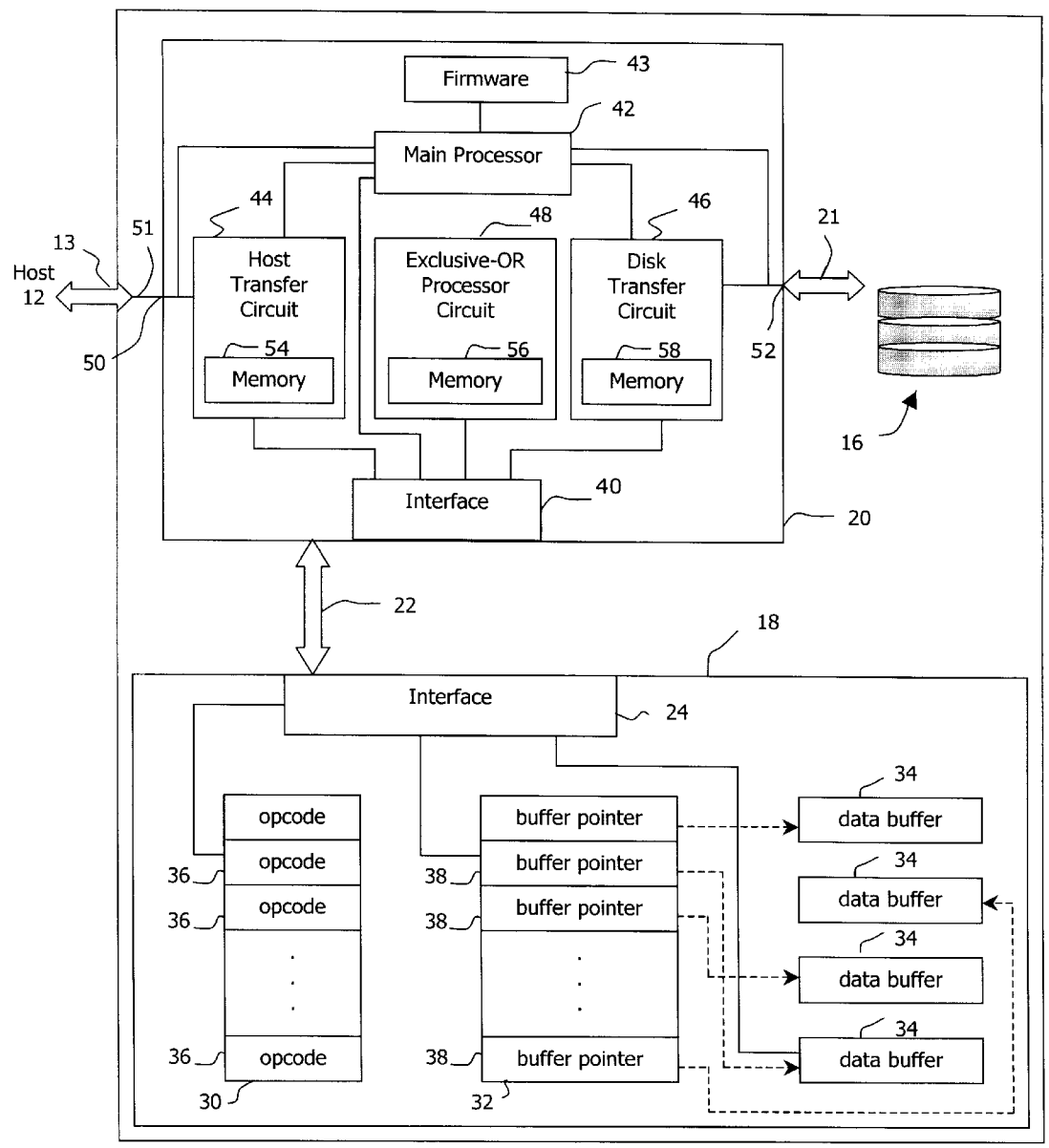
FIG. 2 is a block diagram of one of the disk drives shown in FIG.1.

FIG. 2 shows an exemplary one of the disk drives 14 in communication with the host 12. As shown, the disk drive 14 includes three disks 16, a memory 18 and a controller 20. The disks 16 are adapted to magnetically store binary bits of information. The memory 18 can be any of a variety of well-known memories such as a Dynamic Random Access Memory (DRAM), for electrically storing binary bits of information. The controller 20 controls the transfer of data between the host 12 and the memory 18 and between the memory 18 and the disks 16. The controller 20 communicates with the disks 16 through a bus 21, and with the memory 18 through a bus 22.

The memory 18 is coupled to the bus 22 by an interface 24 and includes storage areas for storing an opcode list 30, a buffer pointer list 32, and data buffers 34. The interface 24 uses addresses received through the bus 22 to access selected storage areas.

The opcode list 30 can contain several storage areas 36, each capable of storing an opcode. An opcode is a computer-readable code used by the disk drive 14 to control processing of data in accordance with a mode indicated by the opcode. The data can be, e.g., stored in associated data buffers 34 or received from the host 12 or the disks 16. The opcodes indicate the status of data corresponding to the opcode, and/or what operation is being performed, or can be performed, on the data. Opcodes can be used by portions of the disk drives 14 to initiate processing, e.g., transferring or exclusive-ORing, of the associated data, and can be overwritten to indicate the new status of the data in response to the processing thereof.

The buffer pointer list 32 can include several storage areas 38, each capable of storing a buffer pointer. Buffer pointers are addresses of storage areas corresponding to the data buffers 34. According to one arrangement, each storage area 36 of the opcode list 30 is associated with a corresponding storage area 38 of the buffer pointer list 32, which corresponds to an associated data buffer 34. Therefore each storage area 36 in the opcode list 30 has an associated data buffer 34 capable of storing data. Data are transferred between the data buffers 34 and the memory interface 24 for transfer between the memory 18 and the controller 20.

The controller 20 includes a controller interface 40, a main processor (e.g., a microprocessor) 42, firmware 43, a host transfer circuit 44, a disk transfer circuit 46, and an exclusive-OR processor circuit 48. The controller 20 communicates with the host 12 through a host port 50. Although the host port 50 of the controller 20 is shown separate from a host port 51 of the drive 14, the host ports 50 and 51 can be the same port. The controller 20 communicates with the disks 16 through a disk port 52. The controller interface 40 couples the controller 20 to the bus 22. The controller interface 40 coordinates data transfer through the bus 22 and the interface 24 between the main processor 42 and the circuits 44, 46 and 48, and the opcode list 30, buffer pointer list 32, and data buffers 34. Thus, the host transfer circuit 44, disk transfer circuit 46, and exclusive-OR processor circuit 48 can communicate with, and therefore transfer data to and receive data from, the opcode list 30, buffer pointer list 32, and data buffers 34 as appropriate.

The main processor 42 can initialize the host transfer circuit 44, disk transfer circuit 46, exclusive-OR processor circuit 48, opcode list 30, and buffer pointer list 32. The main processor 42 is responsive to information received from the host 12, the firmware 43, and/or the disks 16 to set up appropriate data transfers and data processing. The main processor 42 uses the received information to determine how many and which storage areas 34, 36 and 38 to use, and what operations are required for processing and transferring the data. The main processor 42 operates based on information stored in the firmware 43 to: (1) store opcodes and buffer pointers in the opcode list 30 and the buffer pointer list 32; (2) store appropriate addresses of the opcode list 30 and buffer pointer list 32 in a host transfer circuit memory 54, a disk transfer circuit memory 58, and an exclusive-OR transfer circuit memory 56; and (3) set the circuits 44, 46, and 48 to appropriate data processing modes (e.g., XDWRITE and XPWRITE). The main processor 42, because it operates on firmware and may have many tasks to coordinate for the disk drive 14, is relatively slow compared to hardware dedicated to specific tasks. The time required for processing data is reduced by having the main processor 42 initialize opcodes that cause hardware to perform various operations, as described below, relatively quickly compared to the main processor 42.

The host transfer circuit 44 is a hardware circuit, e.g., a hardwired controller (e.g., a state machine) adapted to transfer data between the host port 50 and the memory 18. The host transfer circuit 44 can store addresses of storage areas 36 in the host transfer circuit memory 54 and send a selected one of these addresses to the memory 18 through the controller interface 40. The host transfer circuit 44 can retrieve the opcode stored in the selected storage area 36 and is responsive to the retrieved opcode to transfer data between the host port 50 and the memory 18 through the interfaces 40 and 24. The host transfer circuit 44 is also capable of altering the mode indicated by the opcode stored at the selected address by writing a different opcode to the selected address.

The disk transfer circuit 46 is also a hardwired controller (e.g., a state machine) adapted to transfer data from the disk port 52 to the memory 18. Storage area addresses of the storage areas 36 can be stored in the disk transfer circuit memory 58 and selected by the disk transfer circuit 46. The selected address can be sent by the disk transfer circuit 46 to the memory 18 through the interfaces 40 and 24. The disk transfer circuit 46 can retrieve the opcode stored at the selected storage area 36 and in accordance with the mode indicated by the opcode to transfer data between the disk port 52 and the memory 18. The disk transfer circuit 46 can also alter the mode indicated by the opcode stored at the selected address by writing a different opcode to the selected address.

The exclusive-OR processor circuit 48 is also a hardwired controller (e.g., a state machine) adapted to exclusive-OR data stored in multiple data buffers 34. The exclusive-OR processor circuit 48 is adapted to select storage area addresses, stored in the exclusive-OR transfer circuit memory 56, of opcodes corresponding to data buffers 34 whose data is to be exclusive-ORed. These addresses are transmitted to the memory 18 and the opcodes stored at the selected storage areas 36 are retrieved by the exclusive-OR processor circuit 48. The exclusive-OR processor circuit 48 is responsive to the opcodes to exclusive-OR data from the data buffers 34 associated with the selected storage areas 36. Results of the exclusive-OR are stored by the exclusive-OR processor circuit 48 in one or more of the data buffers 34 and can be used, e.g., as parity information. The exclusive-OR processor circuit 46 can alter the mode indicated by the opcode associated with each data buffer 34 storing exclusive-OR results by writing a different opcode to the appropriate storage area 36.

In operation, the disk drives 14 process data in a relatively fast manner in accordance with equation (7) for XDWRITEs or equation (8) for XPWRITEs.

Figure 3:
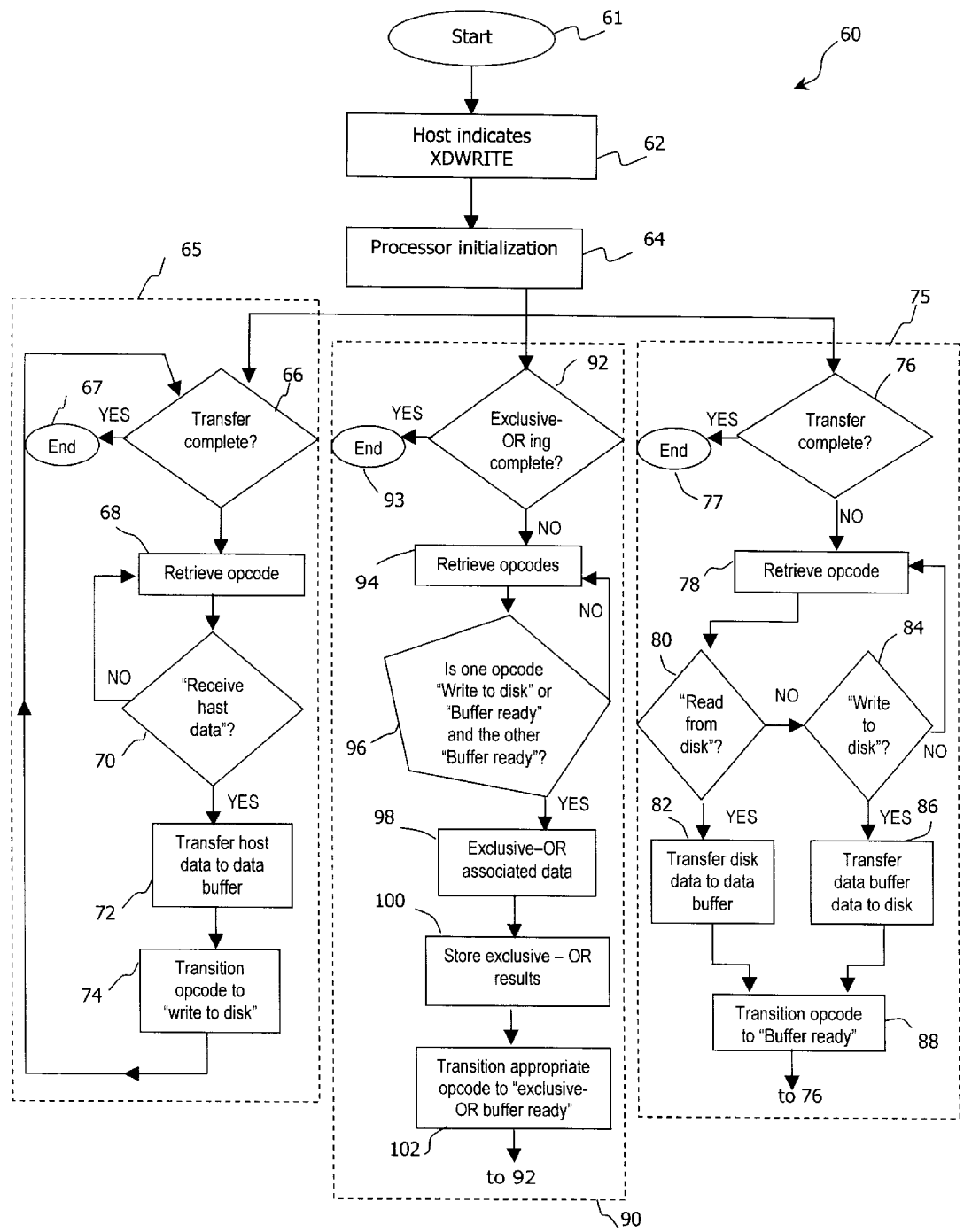
FIG. 3 is a flow chart of a process of performing an exclusive-OR data write.

Referring to FIG. 3, a process 60 of performing an exclusive-OR data write starts 61 with the host 12 indicating 62 to a disk drive 14 to perform an exclusive-OR data write. The indication from the host 12 is communicated to the main processor 42 through host port 50.

The main processor 42 initializes 64 the host transfer circuit 44, disk transfer circuit 46, exclusive-OR processor circuit 48, opcode list 30, and buffer pointer list 32. The main processor 42 processes the indication from the host 12 and information stored in firmware 43 to store appropriate information in the memories 54, 56, and 58, the opcode list 30 and the buffer pointer list 32. The main processor 42 sets the host transfer circuit 44 and the exclusive-OR processor circuit 48 to an exclusive-OR data write mode.

The host transfer circuit 44 processes data according to subprocess 65. A check is made to determine 66 whether the data transfer by the host transfer circuit 44 is complete. Whether more data are expected can be determined by decrementing a counter (not shown) that indicates the number of data blocks to be transferred, as specified by the host 12. If the transfer is complete, then subprocess 65 ends 67. If the transfer is not complete, then the host transfer circuit 44 retrieves 68 an opcode.

Opcodes are retrieved 68 and analyzed 70 by the host transfer circuit 44. To retrieve 68 an opcode, the host transfer circuit 44 selects an opcode address. The selected address is sent to the memory 18 and the opcode stored at the selected address is sent to the host transfer circuit 44. The host transfer circuit 44 determines 70 whether the opcode indicates that the associated data buffer is ready to receive host data, e.g., the opcode indicates a "receive host data" mode. If it does not, for example if the opcode indicates a "no operation" mode, then the host transfer circuit 44 waits, by continuing to retrieve 68 the opcode, until the opcode does indicate the receive host data mode. If the retrieved opcode does indicate the receive host data mode, then host data can be transferred.

If the retrieved opcode indicates the receive host data mode, then the host transfer circuit 44 transfers 72 data and transitions 74 the corresponding opcode. The host transfer circuit transfers 72 data from the host port 50 to the data buffer 34 indicated by the buffer pointer 38 associated with the selected storage area 36. For purposes of illustrating process 60, assume host data is stored in a data buffer $34_1$ with an associated opcode stored at storage area $36_1$. The host transfer circuit 44 transitions 74 the is opcode stored at the selected storage area 36 by writing an opcode to the selected storage area 36 that indicates that the host data has been transferred to the data buffer 34, e.g., that indicates a "write to disk" mode. The host transfer circuit 44 again determines 66 whether more data are expected. Subprocess 65 continues until all expected host data are transferred to data buffers 34.

The disk transfer circuit 46 processes data according to subprocess 75. A check is made to determine 76 whether the data transfer by the disk transfer circuit 46 is complete. If the transfer is complete, then subprocess 75 ends 77. If the transfer is not complete, then the disk transfer circuit 46 retrieves 78 an opcode.

Opcodes are retrieved 78 and analyzed 80, 84 by the disk transfer circuit 46. To retrieve an opcode, the disk transfer circuit 46 selects an opcode address stored in the disk transfer circuit memory 58. These addresses will correspond to storage areas 36 with associated data buffers 34 expected to be needed for storing disk data, and those expected to receive host data. The selected address is sent to the memory 18 and the opcode stored at the selected address is sent to the disk transfer circuit 46. The disk transfer circuit 46 determines 80 whether the opcode stored at the selected address indicates that the associated data buffer 34 is ready to receive disk data, e.g., the opcode indicates a "read from disk" mode.

If the retrieved opcode indicates a read from disk mode, then the disk transfer circuit 46 transfers 82 data from the disk port 52 to the data buffer 34 indicated by the buffer pointer 38 associated with the selected storage area 36. For example, assume disk data are stored in a data buffer $34_2$ with an associated opcode stored at storage area $36_2$.

If the retrieved opcode does not indicate a read from disk mode, then the disk transfer circuit 46 determines 84 whether the opcode indicates that the associated data buffer contains data to be written to the disks 16, e.g., the opcode indicates a "write to disk" mode. If so, then the data (i.e., host data) stored in the associated data buffer 34, e.g. data buffer $34_1$, are transferred 86 to the disk port 52. If the retrieved opcode does not indicate a write to disk mode, then another opcode is retrieved 78. A new opcode is retrieved because the disks 16 are spinning and therefore the opcode associated with the current portion of the disk 16 that can be read from or written to changes.

The disk transfer circuit 46 transitions 88 the opcode stored at the selected storage area 36 to indicate that the associated data buffer has had data transferred to 82 or from 86 it, e.g., to indicate a "buffer ready" mode. The disk transfer circuit 46 again determines 76 whether more data are expected. Subprocess 75 continues until all expected disk data are read from disks 16 and all host data are written to disks 16 (e.g., by using separate decrementing counters, not shown, for disk data reads from, and host data writes to, disks 16).

The exclusive-OR processor circuit 48 processes data according to subprocess 90. A check is made to determine 92 whether the exclusive-ORing of data by the exclusive-OR processor circuit 48 is complete (i.e., whether all host data and corresponding disk data have been exclusive-ORed). If so, then subprocess 90 ends 77. If not, then the exclusive-OR processor circuit 48 retrieves opcodes.

Opcodes are retrieved 94 and analyzed 96 by the exclusive-OR processor circuit 48. To retrieve opcodes, the exclusive-OR processor circuit 48 selects pairs of opcode addresses stored in the exclusive-OR transfer circuit memory 56. These pairs of addresses correspond to storage areas 36, e.g., $36_1$ and $36_2$, with associated data buffers 34, e.g., $34_1$ and $34_2$ that are expected to store host data and corresponding disk data (i.e., host and disk data to be exclusive-ORed). The selected addresses are sent to the memory 18 and the opcodes stored at the selected addresses are sent to the exclusive-OR processor circuit 48. The exclusive-OR processor circuit 48 determines 96 whether data buffer $34_1$ contains host data, e.g., the opcode stored at storage area $36_1$ indicates a "write to disk" mode or a "buffer ready" mode, and whether data buffer 342 contains disk data, e.g., the opcode stored at storage area 362 indicates a "buffer ready" mode. If not, then the exclusive-OR processor circuit 48 waits, by continuing to retrieve 94 the opcodes, until the opcodes indicate the appropriate modes. If so, then the data from buffers $34_1$ and $34_2$ can be exclusive-ORed 98.

If the retrieved opcodes indicate appropriate modes, then exclusive-OR processor circuit 48 exclusive-ORs 98 the associated data, stores 100 the results, and transitions 102 the appropriate opcode(s). The exclusive-OR processor circuit 48 exclusive-ORs 98 the data from the data buffers 34 associated with the retrieved opcodes, e.g., from data buffers $34_1$ and $34_2$. Results of the exclusive-ORing 98 are stored 100 in a data buffer 34, e.g., data buffer $34_2$. Each opcode associated with a data buffer 34 storing exclusive-OR results, e.g., the opcode stored in storage area $36_2$, is transitioned 102 to indicate that the data buffer 34 contains the exclusive-OR results. For example, the exclusive-OR processor circuit can write an opcode to storage area $36_2$ indicating an "exclusive-OR buffer ready" mode. This mode is different than the buffer ready mode to distinguish the exclusive-OR results from host data or disk data that may be stored in the same data buffer 34 as the exclusive-OR results. The exclusive-OR results are stored in anticipation of an XDREAD command from the host 12 to retrieve the stored results. The exclusive-OR processor circuit 48 again determines 92 whether more data are to be exclusive-ORed. Subprocess 90 continues until all expected exclusive-ORs are performed.

The process 60 ends when all of the subprocesses 65, 75 and 90 have ended 67, 77 and 93.

The host transfer circuit 44, disk transfer circuit 46, and exclusive-OR processor circuit 48 can operate independently of the main processor 42, and of each other, to perform subprocesses 65, 75 and 90. Once the main processor 42 initializes the circuits 44, 46 and 48, the circuits 44, 46 and 48 operate based on the opcodes. The circuits 44, 46 and 48 can perform the subprocesses 65, 75 and 90 concurrently. Thus, data can be transferred between the host port 50 and the data buffers 34 while data are transferred between the disk port 52 and the data buffers 34, and while data are exclusive-ORed by the exclusive-OR processor circuit 48.

Figure 4:
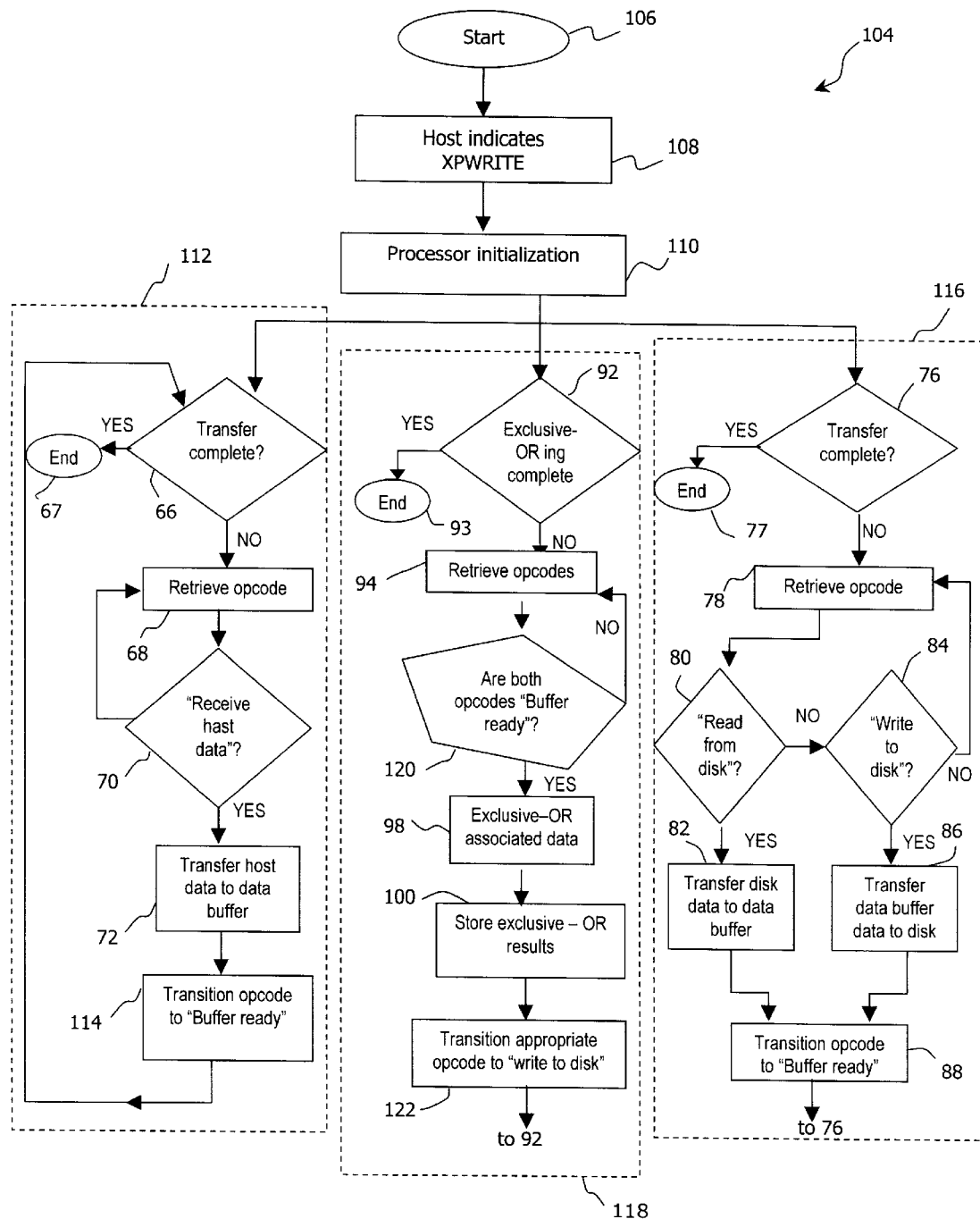
FIG. 4 is a flow chart of a process of performing an exclusive-OR parity write.

Referring to FIG. 4, a process 104 of performing an exclusive-OR parity write starts 106 with the host 12 indicating 108 to a disk drive 14 to perform an exclusive-OR parity write. The indication from the host 12 is communicated to the main processor 42 through host port 50.

The main processor 42 initializes 110 the host transfer circuit 44, disk transfer circuit 46, exclusive-OR processor circuit 48, opcode list 30, and buffer pointer list 32, similar to process 60. In process 104, however, the main processor 42 sets the host transfer circuit 44 and the exclusive-OR processor circuit 48 to an exclusive-OR parity write mode.

The host transfer circuit 44 processes data according to subprocess 112, which is similar to subprocess 65 described above. Consequently, identical reference numerals are used for similar actions. In subprocess 112, unlike in subprocess 65, the host transfer circuit 44 transitions 114 the opcode stored at the selected storage area 361 to a "buffer ready" mode to indicate that the host data has been transferred 72 to a data buffer, e.g., data buffer $34_1$, and can be read from the data buffer $34_1$. Subprocess 112 continues until all expected host data are transferred to data buffers 34.

The disk transfer circuit 46 processes data according to subprocess 116, which is similar to subprocess 75 described above. Subprocess 116 executes actions similar to subprocess 65, and therefore identical reference numbers in subprocesses 75 and 116 indicate similar actions. The addresses selected 76 by subprocess 116, as determined and specified by the main processor 42, need not include addresses of storage areas 36 associated with data buffers 34 that will receive host data. In subprocess 116, when an opcode indicates a "write to disk" mode, the associated data buffer 34, e.g., data buffer $34_2$, will be storing exclusive-OR results, as described below. Thus, when the disk transfer circuit 46 transfers 86 data to the disks 16, it will be transferring exclusive-OR results. Subprocess 116 continues until all expected disk data are read from disks 16 and all expected exclusive-OR results are written to disks 16 (e.g., by using separate decrementing counters, not shown, for disk data reads and exclusive-OR data writes).

The exclusive-OR processor circuit 48 processes data according to subprocess 118, which is similar to subprocess 90 described above as indicated by common reference numerals. In subprocess 118, the exclusive-OR processor circuit 48 determines 120 whether both opcodes of the selected storage areas indicate "buffer ready" modes. If so, then the exclusive-OR processor circuit 48 exclusive-ORs 98 the data stored in the associated data buffers 34. The exclusive-OR processor circuit 48 transitions 122 the opcode associated with the data buffer 34 storing the exclusive-OR results by writing an opcode, that indicates a "write to disk" mode, to the appropriate storage area 36. Subprocess 118 continues until all expected exclusive-ORs are performed.

As with the XDWRITE process 60 shown in FIG. 3, in the XPWRITE process 104 shown in FIG. 4 the host transfer circuit 44, the disk transfer circuit 46, and the exclusive OR processor circuit 48 can transfer and process data concurrently. Thus, subprocesses 112, 116 and 118 can occur simultaneously. Data transferred to data buffers 34 by subprocesses 112 and 116 can be exclusive-ORed while more data are transferred by subprocesses 112 and 116. This parallel processing reduces the time required to perform an XPWRITE compared to serial processing.

Figure 5:
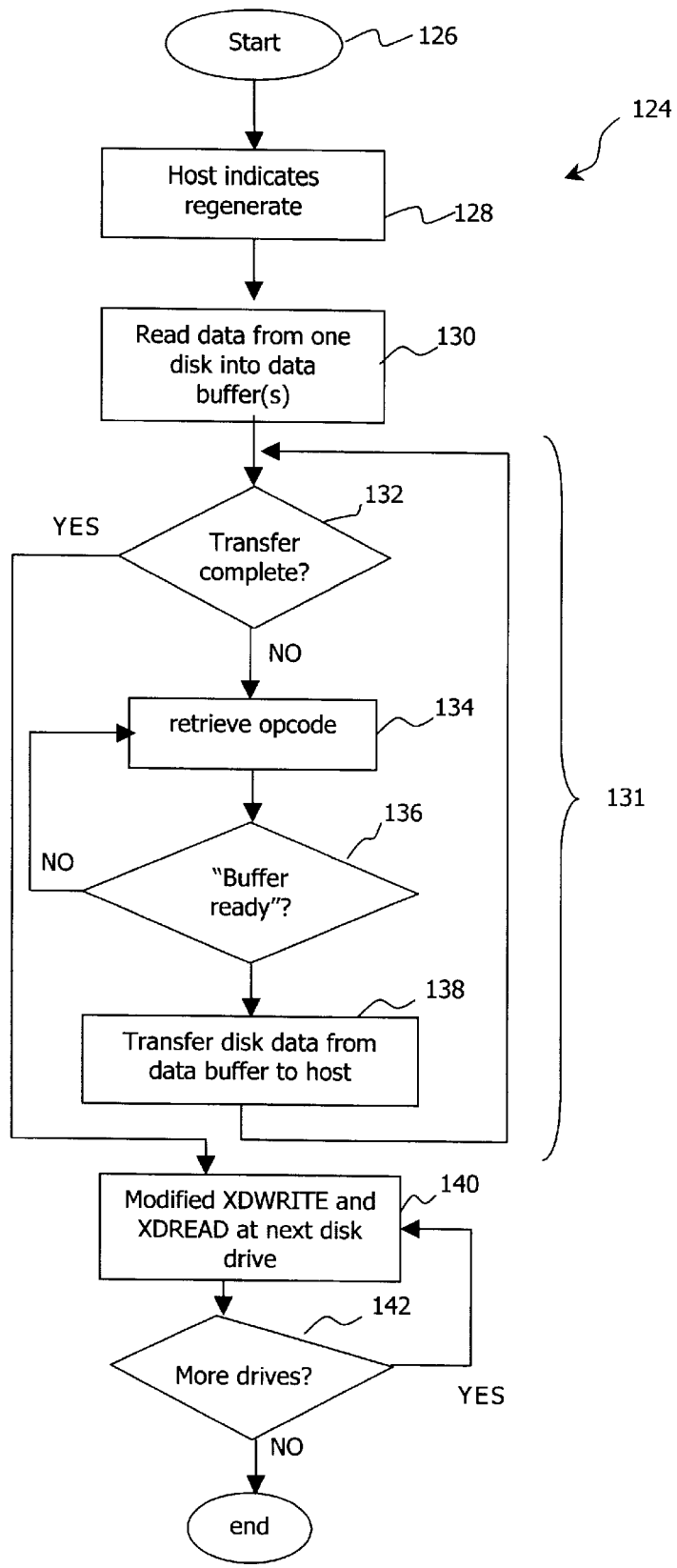
FIG. 5 is a flow chart of a process of reproducing data of one of the several disk drives shown in FIG. 1.

Referring to FIG. 5, a process 124 of reproducing or regenerating the data of one disk drive 14 from the data in the same stripe on other disk drives 14 starts 126 with the host 12 indicating 128 a REGENERATE mode.

The data from a selected one of the disk drives 14 are read 130 into data buffer(s) 34. The data are read 130 into one or more data buffers 34 by a process similar to subprocess 75 shown in FIG. 3. In particular, the main processor 42 initializes, for a data read, the host transfer circuit 44, the disk transfer circuit 46, the opcode list 30 and the buffer pointer list 32 according to the expected amount of data and location of the data on disks 16. The disk transfer circuit 46 retrieves 78 an opcode, and determines 80 whether the opcode indicates a "read from disk" mode. If not, then another opcode is retrieved 78. If so, then the data are transferred 82 to a data buffer 34 and the opcode is transitioned 88 to a "buffer ready" mode. This continues until all expected data are read.

Referring again to FIG. 5, the read data are transferred 131 from the data buffer(s) 34 to the host 12. The host transfer circuit 44 of the selected disk drive 14 determines 132 whether the data transfer is complete. If so, then process 124 proceeds to exclusive-ORing 140 described below. If the data transfer is not complete, then an opcode is retrieved 134. The host transfer circuit 44 determines 136 whether the retrieved opcode indicates a "buffer ready" mode. If not, then the host transfer circuit 44 waits, by continuing to retrieve 134 the opcode, until the opcode indicates an appropriate mode. If the retrieved opcode does indicate the buffer ready mode, then the host transfer circuit 44 transfers 138 the data from the corresponding data buffer 34 to the host port 50. The process 124 returns to determine 132 whether the data transfer is complete until all expected data blocks are transferred 138 to the host port 50.

The data transferred 138 to the host port 50 are sent by the host 12 to another disk drive 14 to have a modified XDWRITE process and an XDREAD process performed 140. The modified XDWRITE process is similar to the XDWRITE process 60 shown in FIG. 3. In the modified XDWRITE process, however, if the disk transfer circuit 46 determines 84 that the opcode indicates a "write to disk" mode, the disk transfer circuit 46 does not transfer 86 the data buffer data to the disks 16. Thus, transferring 86 is eliminated from subprocess 75, and the modified XDWRITE process proceeds to transition 88 the opcode. Additionally, the data in data buffer(s) 34 associated with opcodes indicating an exclusive-OR buffer ready mode are transferred to the host port 50. These data are transferred using operations similar to the transferring operation 131 discussed above in response to the host 12 issuing an XDREAD command. These data are intermediate, temporary data. The modified XDWRITE and XDREAD processes are performed 140 until the data on the selected drive 14 of all stripes to be reproduced have been read, exclusive-ORed, and transferred to the host 12.

The host 12 determines 142 whether exclusive-OR data reads from more disk drives 14 need to be performed 140. If so, then the host 12 sends the intermediate, temporary data to the next drive 14. The exclusive-OR data read is performed 140 by the next drive 14, updating the intermediate, temporary data. This continues until the exclusive-OR data read has been performed on all disk drives 14 except the disk drive 14 whose data are to be reproduced and the first disk drive 14 selected in process 124. The intermediate, temporary data from the last drive 14 are the data to be reproduced. The host 12 receives the reproduced data and the process 124 ends. The reproduced data can be supplied to the entity requesting the data even if the disk drive 14 whose data were reproduced has malfunctioned; if the data were not retrievable from the disk drive 14 but the disk drive 14 is otherwise functional, then the reproduced data can be written to the disk drive 14 whose data were reproduced or otherwise processed.

Other embodiments are within the scope of the claims. For example, the host 12 can set the modes (e.g., XDWRITE, XPWRITE, REGENERATE) of the host transfer circuit 44, disk transfer circuit 46, and exclusive-OR processor circuit 48 directly, instead of through the main processor 42. Additionally, the bus 22 and the interfaces 24 and 40 can be replaced by separate busses and multiplexers. Also, if a circuit, e.g., the host transfer circuit 44, determines that an opcode at a first address does not indicate an appropriate mode, the circuit can select a second address and return to the first address later.

What is claimed is:

1. An apparatus comprising:

a host port for coupling to a host;

a storage disk coupled to a disk port;

a memory for storing opcodes, data buffer pointers associated with the opcodes, and data in data buffers indicated by the data buffers;

a data transfer circuit to store an address corresponding to a selected one of the opcodes, the data transfer circuit being responsive to a mode indicated by the selected opcode to transfer data between a selected data buffer associated with the selected opcode and one of the ports; and an exclusive-OR processor circuit to store addresses corresponding to a first selected opcode and a second selected opcode, the exclusive-OR processor circuit being responsive to the modes indicated by the first and second selected opcodes to exclusive-OR the data stored in the data buffers associated with the first and second selected opcodes.

2. The apparatus of claim 1 wherein the exclusive-OR processor circuit can exclusive-OR the data from the selected opcodes while the data transfer circuit transfers data between a data buffer and one of the ports.

3. The apparatus of claim 1 wherein the exclusive-OR processor circuit is responsive to the first selected opcode indicating a ready mode or a write mode and the second selected opcode indicating a ready mode to exclusive-OR the data in the data buffers associated with the first and second selected opcodes.

4. The apparatus of claim 3 wherein the exclusive-OR processor circuit is adapted to transition the second selected opcode to indicate an exclusive-OR buffer ready mode if the apparatus is in an exclusive-OR data write mode and to indicate a write mode if the apparatus is in an exclusive-OR parity write mode.

5. An apparatus comprising:
a host port for coupling to a host;
a storage disk coupled to a disk port;
a memory for storing opcodes, data buffer pointers associated with the opcodes, and data in data buffers indicated by the data buffers;
a data transfer circuit to store an address corresponding to a selected one of the opcodes, the data transfer circuit being responsive to a mode indicated by the selected opcode to transfer data between a selected data buffer associated with the selected opcode and one of the ports; and
a processor for initializing the modes indicated by the opcodes and storing the address in the data transfer circuit an exclusive-OR processor circuit to store addresses corresponding to a first selected opcode and a second selected opcode, the exclusive-OR processor circuit being responsive to the modes indicated by the first and second selected opcodes to exclusive-OR the data stored in the data buffers associated with the first and second selected opcodes.

6. An apparatus comprising:
a host port for coupling to a host;
a storage disk coupled to a disk port;
a memory for storing opcodes, data buffer pointers associated with the opcodes, and data in data buffers indicated by the data buffers;
a data transfer circuit to store an address corresponding to a selected one of the opcodes, the data transfer circuit being responsive to a mode indicated by the selected opcode to transfer data between a selected data buffer associated with the selected opcode and one of the ports;
wherein the data transfer circuit is a host transfer circuit responsive to the selected opcode to transfer data between the host port and the selected data buffer; and
a disk transfer circuit responsive to another selected opcode to transfer data between the disk port and the data buffer associated with the another selected opcode, the host transfer circuit and the disk transfer circuit capable of transferring data concurrently an exclusive-OR processor circuit to store addresses corresponding to a first selected opcode and a second selected opcode, the exclusive-OR processor circuit being responsive to the modes indicated by the first and second selected opcodes to exclusive-OR the data stored in the data buffers associated with the first and second selected opcodes.

7. The apparatus of claim 6 wherein the host transfer circuit is responsive to the selected opcode indicating a receive mode to transfer data from the host port to the selected data buffer.

8. The apparatus of claim 7 wherein the host transfer circuit is adapted to transition the selected opcode from indicating the receive mode to indicating a write mode if the apparatus is in an exclusive-OR data write mode and to indicating a buffer ready mode if the apparatus is in an exclusive-OR parity write mode.

9. The apparatus of claim 6 wherein the host transfer circuit is responsive to the selected opcode indicating a write mode, a buffer ready mode, or an exclusive-OR buffer ready mode to transfer data from the selected data buffer to the host port if the apparatus is in a read mode.

10. The apparatus of claim 6 wherein the disk transfer circuit is responsive to the another selected opcode indicating a read from disk mode to transfer data from the disk port to the selected data buffer.

11. The apparatus of claim 10 wherein the disk transfer circuit is adapted to transition the another selected opcode from indicating the read from disk mode to indicating a buffer ready mode.

12. The apparatus of claim 6 wherein the disk transfer circuit is responsive to the another selected opcode indicating a write mode to transfer data from the selected data buffer to the disk port.

13. An apparatus comprising:
a host port for coupling to a host;
a storage disk coupled to a disk port;
a memory for storing opcodes, data buffer pointers associated with the opcodes, and data in data buffers indicated by the data buffer pointers; and
an exclusive-OR processor circuit to store addresses corresponding to a first selected opcode and a second selected opcode, the data transfer circuit being responsive to modes indicated by the first and second selected opcodes to exclusive-OR the data stored in the data buffers associated with the first and second selected opcodes.

14. The apparatus of claim 13 further comprising a processor for initializing the modes indicated by the opcodes and storing the addresses in the exclusive-OR processor circuit.

15. A storage device controller comprising:
a host data port for coupling to a host;
a disk data port for coupling to a storage disk;
a processor for transmitting opcodes to the interface;
an interface for coupling to a memory used to store, in data buffers, data in transit between the head disk assembly and host port, and to store opcodes corresponding to the data buffers and representing state information indicative of modes; and
an exclusive-OR processor circuit responsive to modes indicated by opcodes received through the interface to exclusive-OR data, corresponding to the opcodes, received through the interface.

16. A method of electronically manipulating data in a storage drive, the storage drive including a host port for coupling to a host and a data port coupled to a plurality of storage disks, the method comprising:
setting a first opcode to indicate a mode by storing the opcode in memory using a processor, the first opcode being associated with a first data buffer; setting a second opcode to indicate a mode by storing the opcode in memory using a processor, the second opcode being associated with a second data buffer; and
transferring data between one of the ports and the data buffer, using a data transfer circuit, in response to the mode indicated by the opcode an exclusive-OR processor circuit to store addresses corresponding to a first selected opcode and a second selected opcode, the exclusive-OR processor circuit being responsive to the modes indicated by the first and second selected opcodes to exclusive-OR the data stored in the data buffers associated with the first and second selected opcodes.

17. The method of claim 16 further comprising using the processor to store an address of the opcode in the data transfer circuit, the data transfer circuit transferring the data between the one of the ports and the data buffer independent of the processor.

18. A method of electronically manipulating data in a storage drive, the storage drive including a host port for coupling to a host and a data port coupled to a plurality of storage disks, the method comprising:

setting a first opcode to indicate a mode, the first opcode being associated with a first data buffer; setting a second opcode to indicate a mode, the second opcode being associated with a second data buffer;

transferring data between one of the ports and the data buffer, using a data transfer circuit, in response to the first mode indicated by the opcode; and transitioning the mode indicated by the opcode to a second mode, the modes being different an exclusive-OR processor circuit to store addresses corresponding to a first selected opcode and a second selected opcode, the exclusive-OR processor circuit being responsive to the modes indicated by the first and second selected opcodes to exclusive-OR the data stored in the data buffers associated with the first and second selected opcodes.

19. The method of claim 18 wherein the first mode is a receive host data mode, the transferring of data comprises transferring data from the host port to the data buffer, and the second mode is a write to disk mode if the storage drive is in an exclusive-OR data write mode and the second mode is buffer ready mode if the storage drive is in an exclusive-OR parity write mode.

20. The method of claim 18 wherein the first mode is a read from disk mode, the transferring of data comprises transferring data from the disk port to the data buffer, and the second mode is a buffer ready mode.

21. A method of electronically manipulating data in a storage drive, the storage drive including a host port for coupling to a host and a data port coupled to a plurality of storage disks, the method comprising:

setting a first opcode to indicate a mode, the first opcode being associated with a first data buffer; setting a second opcode to indicate a mode, the second opcode being associated with a second data buffer, transferring data between one of the ports and the data buffer, using a data transfer circuit, in response to the mode indicated by the opcode; and an exclusive-OR processor circuit to store addresses corresponding to a first selected opcode and a second selected opcode, the exclusive-OR processor circuit being responsive to the modes indicated by the first and second selected opcodes to exclusive-OR the data stored in the data buffers associated with the first and second selected opcodes transferring data from the data buffer to one of the ports if the opcode indicates a write mode.

22. A method of electronically manipulating data in a storage drive, the storage drive including a host port for coupling to a host and a data port coupled to a plurality of storage disks, the method comprising:

setting a first opcode to indicate a mode, the first opcode being associated with a first data buffer;

transferring data between one of the ports and the first data buffer, using a data transfer circuit, in response to the mode indicated by the first opcode;

setting a second opcode to indicate a mode, the second opcode being associated with a second data buffer;

transferring data between the other one of the ports and the second data buffer, using a data transfer circuit, in response to the mode indicated by the second opcode;

exclusive-ORing data in the first and second data buffers, using an exclusive-OR processor circuit, in response to modes indicated by the first and second opcodes.

23. The method of claim 22 wherein the exclusive-ORing occurs concurrently with transfer of data between one of the ports and one of the data buffers.

24. The method of claim 22 further comprising:

storing results of the exclusive-ORing in a selected one of the data buffers; and transitioning the opcode corresponding to the selected data buffer to indicate a different mode than before the storing of the exclusive-OR results.

25. The method of claim 24 wherein the different mode is an exclusive-OR buffer ready mode if the storage drive is in an exclusive-OR data write mode and the different mode is a write mode if the storage drive is in an exclusive-OR parity write mode.

26. A method of electronically manipulating data in a storage drive, the storage drive including a host port for coupling to a host and a data port coupled to a plurality of storage disks, the method comprising:

setting a plurality of opcodes, each indicating a mode, by storing the opcodes in memory using a processor, the opcodes being associated with data;

exclusive-ORing data in the data buffers corresponding to the opcodes, using an exclusive-OR processor circuit, in response to modes indicated by the opcodes.

27. The method of claim 26 wherein the exclusive-OR processor circuit exclusive-ORs data from the data buffers independently of the processor.

28. A storage device controller comprising:

a host data port for coupling to a host;

a disk data port for coupling to a storage disk;

an interface for coupling to a memory used to store, in data buffers, data in transit between the head disk assembly and host port, and to store opcodes corresponding to the data buffers and representing state information indicative of modes;

an exclusive-OR processor circuit responsive to modes indicated by opcodes received through the interface to exclusive-OR data, corresponding to the opcodes, received through the interface;

a host data transfer circuit responsive to modes indicated by opcodes received through the interface to transfer data between the host data port and the interface; and a disk data transfer circuit responsive to modes indicated by opcodes received through the interface to transfer data between the disk data port and the interface.

29. The controller of claim 28 wherein at least one of the data transfer circuits is capable of providing an indication to transition a received opcode to indicate a different mode than the mode indicated by the received opcode.

30. A storage device controller comprising:

a host data port for coupling to a host;

a disk data port for coupling to a storage disk;

an interface for coupling to a memory used to store, in data buffers, data in transit between the head disk assembly and host port, and to store opcodes corresponding to the data buffers and representing state information indicative of modes;

an exclusive-OR processor circuit responsive to modes indicated by opcodes received through the interface to exclusive-OR data, corresponding to the opcodes, received through the interface; and wherein the exclusive-OR processor circuit is capable of providing an indication to transition a received opcode to indicate a different mode than the mode indicated by the received opcode.

* * * * *